United States Patent
Kornexl

(10) Patent No.: US 9,168,710 B2
(45) Date of Patent: Oct. 27, 2015

(54) MOTOR-VEHICLE TOP

(71) Applicant: Christian Kornexl, Roehrnbach (DE)

(72) Inventor: Christian Kornexl, Roehrnbach (DE)

(73) Assignee: PARAT BETEILIGUNGS GMBH, Neureichenau (DE)

( * ) Notice: Subject to any disclaimer, the term of this patent is extended or adjusted under 35 U.S.C. 154(b) by 0 days.

(21) Appl. No.: 13/908,503

(22) Filed: Jun. 3, 2013

(65) Prior Publication Data

US 2014/0028048 A1 Jan. 30, 2014

(30) Foreign Application Priority Data

Jul. 25, 2012 (DE) .................. 10 2012 014 689

(51) Int. Cl.
| | |
|---|---|
| B29D 99/00 | (2010.01) |
| B60J 7/12 | (2006.01) |
| B60J 10/00 | (2006.01) |
| B60J 10/02 | (2006.01) |
| B60J 1/18 | (2006.01) |

(52) U.S. Cl.
CPC .............. B29D 99/001 (2013.01); B60J 1/18 (2013.01); B60J 7/1226 (2013.01); B60J 10/0002 (2013.01); B60J 10/02 (2013.01)

(58) Field of Classification Search
CPC ........... B60J 10/0002; B60J 10/02; B60J 1/18
USPC .......... 296/107.07, 146.14, 107.11, 107.04, 296/107.06; 29/897.2; 264/240, 248, 249, 264/257, 259, 261, 263
See application file for complete search history.

(56) References Cited

U.S. PATENT DOCUMENTS

| | | | |
|---|---|---|---|
| 6,082,807 | A | 7/2000 | Hartmann |
| 6,170,901 | B1 | 1/2001 | Hartmann |
| 6,340,196 | B1 * | 1/2002 | Windpassinger et al. ............ 296/107.11 |
| 2013/0038083 | A1 | 2/2013 | Ascher |

* cited by examiner

*Primary Examiner* — Joseph D Pape
*Assistant Examiner* — Dana Ivey
(74) *Attorney, Agent, or Firm* — Lucas & Mercanti, LLP; Jonathan Myers

(57) ABSTRACT

The invention relates, among other aspects, to a motor-vehicle top (10) comprising a flexible cover layer (11) that provides an outer face of the top with a cutout provided therein, and at least one window is provided in the cutout, particularly a rear window (12), a circumferential edge region of the cover layer being connected to an outer window edge by a polyurethane bead (13), and wherein the polyurethane bead is synthesized by reacting an isocyanate component with a polyol component, the polyol component comprising at least the following constituents:
a) polyols, herein polyetherols and/or polyesterols;
b) a propellant;
c) a lead-free catalyst.

22 Claims, 1 Drawing Sheet

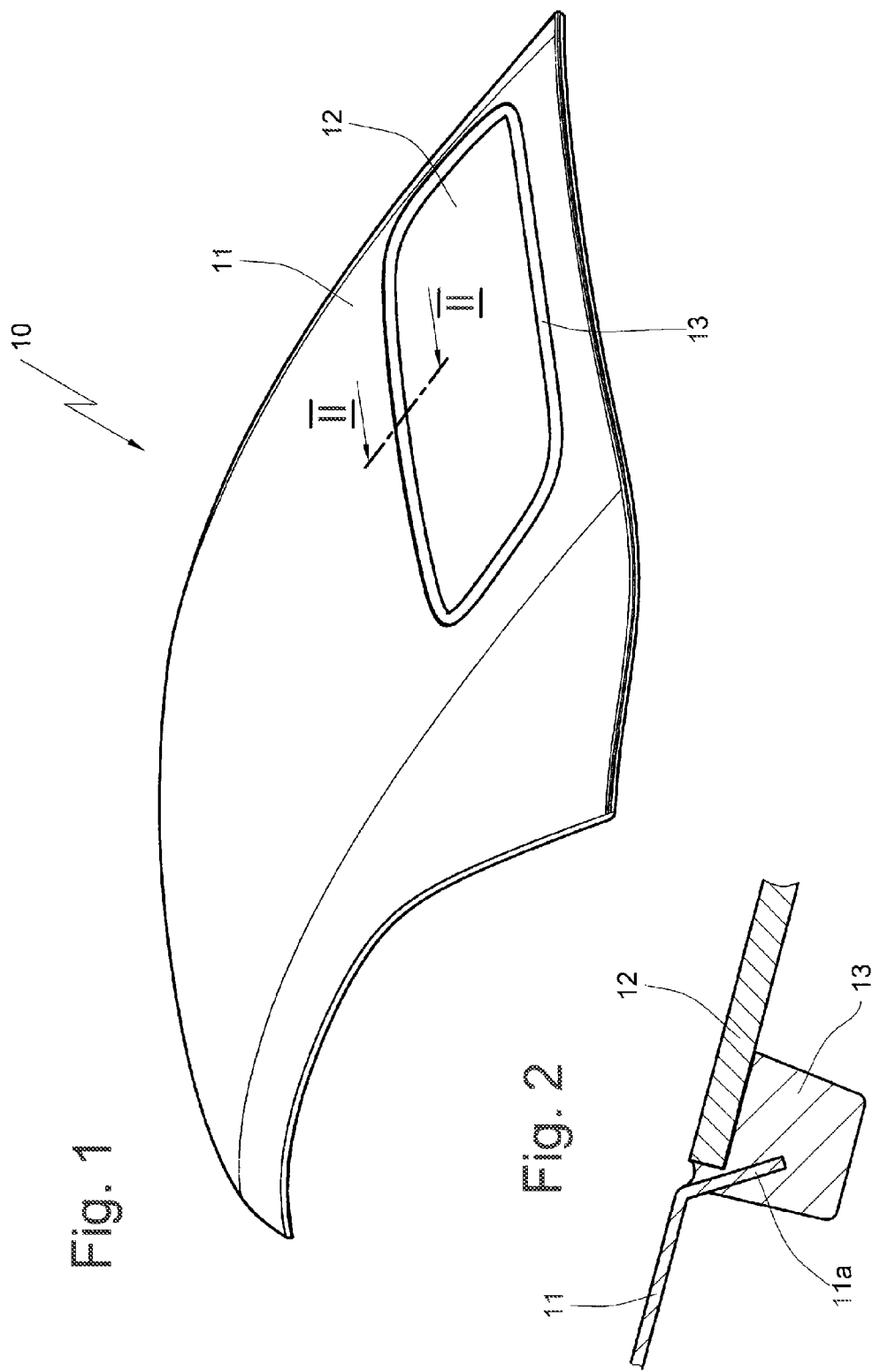

MOTOR-VEHICLE TOP

CROSS REFERENCE TO RELATED APPLICATIONS

Applicant claims the priority of his German Patent Application DE 10 2012 014 689.2 filed 25 Jul. 2012.

FIELD OF THE INVENTION

The invention relates primarily to a convertible motor-vehicle top according to claim 1.

BACKGROUND OF THE INVENTION

For decades, the applicant has been developing and manufacturing convertible tops for motor vehicles. Over the course of about the past 15 years, in particular, the applicant has been using a polyurethane sealing compound on a large scale for connecting sections of tops to other elements, particularly to the rear window of a motor vehicle.

The invention relates to a soft top, meaning a convertible roof construction that provides for at least one flexible, particularly textile, top layer. The invention thus relates to tops with only one top layer, as well as tops with an outer and an inner top layer and possibly, in addition, further cover layers.

Typically, when the roof is closed, the top is braced by a plurality of convertible bows and held taut in order to ensure the integrity of the shape of the convertible top. To open the roof, the bows are moved, for example, manually, in part with the assistance of a cable control, loops, rigid or elastic elements that connect the cover layer sections to other elements, linkages, and the like that entrain the top sections, controllably gather, fold or deposit them, if necessary, compressing them for stowing purposes. The folded top can be stowed when the roof is open, for example, under a trunk lid or under a so-called tonneau cover. More recently, tops have become known that use electrical drive and control mechanisms to allow for a fully automated opening and closing of the top.

A window is typically provided at least in the rear of the convertible top to provide the driver and passengers alike with a view toward the rear. However, the invention also relates to tops for motor vehicles that include, only or in additional to the rear window, one or several side windows such as, for example, transparent or translucent elements provided at the C columns.

The invention relates to the special configuration of the fastening and connecting area between such a window that is provided in the convertible top and the layer of the top that surrounds the window.

Over the life of the vehicle, this connecting area is subject to enormous stresses that challenge mechanical stability. On the one hand, this connecting area is exposed to special mechanical and climate-dependent stresses; on the other hand, it is especially this connecting area that must ensure the absolute and permanent tightness of the seal, provide sufficient stability even in a collision and must, finally, also ensure compliance with high standards that are demanded regarding a desired appearance.

Specification DE 197 24 592 [U.S. Pat. No. 6,082,807] by the applicant discloses a convertible top of a vehicle that provides for a connection between the window and the top made of a PUR cast resin bead element. The PUR cast resin bead element that is described therein is produced by a two-component casting method.

OBJECT OF THE INVENTION

Based on the motor-vehicle top as described in the introduction, it is the object of the present invention to improve the known top of a motor vehicle.

SUMMARY OF THE INVENTION

The invention achieves this object by by employing the following features:

The motor-vehicle top comprises at least one cover layer. The cover layer is flexibly configured and provides an outer layer of the top. The motor-vehicle top can optionally also include an inner cover layer (the so-called inside roof lining) or insulating layers that are provided between the [outer] cover layer and the inner cover layer, such as, for example, according to the description in applicant's republished German application DE 10 2012 004 032.6.

The cover layer is flexibly configured, meaning it is, in particular, foldable or reversible. Correspondingly, the issue here is a flexible, so-called soft convertible top as opposed to a retractable hard top (RHT).

A cutout is provided in the cover layer that has a rear window set therein. The outer edge of the window is circumferentially framed by a bead. The bead is made of polyurethane and connects the edge of the window to the cover layer, more precisely, to the edge of the cover layer that surrounds the cutout. The polyurethane bead is the product of a polyaddition reaction of a polyol component with an isocyanate component.

The isocyanate component includes isocyanates with energy-rich, very reactive isocyanate groups (—N=C=O). It is able to react exothermically with hydrogen-active compounds, under suitable condition with itself, but also with other reaction partners. The isocyanate component according to the invention comprises or consists of one or a plurality of di- and/or polyisocyanates. For example, easily conceivable for use are the technically most important and most commonly used isocyanates such as TDI, NDI, MDI, IPDI or HDI, or combinations thereof, as described, for example, in the textbook by Sächtling, *Kunststofftaschenbuch,* 29th edition 2004, page 539.

A special aspect of the invention is the preparation of the polyol component. According to the invention, the component comprises a plurality of constituents. These are inter alfa: a) polyol, in form of polyetherol and/or polyesterol. These materials are also referred to as polyether polyols or polyester polyols, respectively. Finally, organically filled polyols are also conceivable constituents of the polyol component.

The polyol component according to the invention comprises, furthermore, b) a propellant; and c) a lead-free catalyst.

The propellant can be a physical or a chemical propellant, or a combination of a chemical and a physical propellant. Conceivable physical propellants are, for example pentanes or other homologous alkanes, or halogen-containing components. A conceivable chemical propellant is, for example, water.

Finally, the invention also provides for a catalyst. The catalyst is, in particular, also referred to as an activator or co-catalyst.

According to the invention, the catalyst is lead-free. The lead-free catalyst can comprise, in particular, a metal compound, more particularly an organic metal compound, or be provided by them. According to the invention, the metal compound can comprise a tin, bismuth, thallium, zinc or rare earth compound, or be provided by them. These substances constitute the complex center (coordination compound) and function as a Lewis acid.

Alternately, the lead-free catalyst is provided or supported by amines or comprised of amines. Suitable amines for this purpose are listed in detail below.

The catalyst plays a major role in preparations according to the polyisocyanate addition method, particularly for cellular plastics. In particular, the catalyst is used to drastically accelerate the reaction of the polyol compounds that contain hydroxyl groups, with, if necessary organic, if necessary modified, polyisocyanate compounds, by reducing the activation energy.

The lead-free catalyst can comprise organic metal compounds, or it can be provided thereby, preferably organic tin compounds, such as tin(II) salts of organic carboxylic acids, for example tin(II) acetate, tin(II) octoate, tin(II) ethylhexoate and tin(II) laurate, as well as the dialkyl tin(IV) salts of organic carboxylic acids, such as, for example, dibutyl tin diacetate, dibutyl tin dilaurate, dibutyl tin maleate and dioctyl tin diacetate.

The lead-free catalyst can comprise bismuth compounds, particularly bismuth carboxylates bi(COOR)$_3$, or be provided by them, where R denotes a C5 to C17 alkyl moiety, particularly a C5 to C11 alkyl moiety, preferably C7 to C10 alkyl moiety.

The lead-free catalyst can preferably comprise conventional bismuth catalysts, or be provided by them. These are, for example, bismuth carboxylate such as, for example, acetate, oleate, octoate or neodecanoate.

Furthermore, these exists the possibility that the lead-free catalyst comprises bismuth nitrate, bismuth halides, for example bi-fluoride, bi-chloride, bi-bromide, bi-iodide, bismuth sulfide, bismuth oxide, bismuth phosphate, bismuth trifluoromethanesulfonate, bismuth salicylate, bismuth-2,2, 6,6-tetramethyl-5 3,5-heptanedionate, bismuth naphthanate, bismuth citrate, bismuth subgallate or bismuth subsalicylate, or is provided by these materials, as well as mixtures or combinations of the listed compounds, or is provided by them.

Organic metal compounds are used as catalysts separately or, for example, combined with other catalysts that are represented by strongly basic amines.

The amines that function as lead-free catalysts are listed below. They can also be used by themselves, meaning without the use of or in combination with organic metal compounds, as lead-free catalysts within the meaning of the invention.

Possible amines are: tertiary amines, such as sebacic acid bis(1,2,2,6,6-pentamethyl-4-piperidinyl)ester, 2,3-dimethyl-3,4,5,6-tetrahydropyrimidine, 4-(4-oxo-1,2,3,4,6,7,12,12b-octahydropyrido[2,1-a]-β-carbolin-12b-yl) butyric acid, 1,8-diazabicyclo[5.4.0]undec-7-ene, triethylamine, tributylamine, dimethylbenzylamine, -methyl-N-ethyl-, N-cyclohexylmorpholine, N,N,N'N'-tetramethylethylenediamine, N,N,N'N'-tetramethyl-butanediamine, N,N,N'N'-tetramethylhexanediamine, pentamethyl-diethylenetriamine, tetramethyldiaminoethylether, bis-(dimethylaminopropyl) urea, dimethylpiperazine, 1,2-dimethylimidazole, 1-azobicyclo(3.3.0) octane and, preferably 1,4-diaza-bicyclo-(2.2.2) octane, DBU (1,5-diaza-bicyclo[5.4.0]undec-5-ene), malonic acid-2-formalamino-2-[3,5-di-t-butyl-4-hydroxybenzyl]-diethyl(ester), [4,4-dimethyl-5-(2,3,3-trimethyl-5-methylthio-5-pyrrolin-2-ylmethylene)-5-pyrrolin-2-ylthio]-acetic acid-tert.-butyl-ester, 10-oxo-5,5-dimethyl-5-sila-5, 10-dihydro-5H-benzo[e]pyrido[3,4-b]azepine, decahydroisoquinoline-3-carboxyl acid methylester or also piperidine derivatives, such as, for example, 1-(1-cyclopropyl-pentyl)piperidine, bis(1,2,2,6,6-pentamethyl-4-piperidyl)sebacate and alcanol compounds, such as triethanolamine, triisopropanolamine, -methyl- and N-ethyldiethanolamine and dimethylethanolamine, or mixtures of these materials.

Lead-containing compounds have been used to date as catalysts in polyurethane sealing compounds in the context of applicant's operation, particularly lead salts branched at C6-C19. These lead-containing catalysts were used, on the one hand, to increase the selectivity of the desired chemical reaction and to suppress secondary reactions, particularly the formation of urea derivatives. On the other hand, these lead compounds were employed in order to be able to perform the desired polyaddition reaction at low temperatures.

The ability to manufacture at low temperatures plays a major role with regard to the connecting area between the rear window and the flexible material of the top of the motor vehicle, which is of interest here. If temperatures are too high, the appearance of the fabric of the top can be greatly compromised. For example, if conventional textile materials are used for the cover layer, a temperature above 90° [C] can already cause material changes in the cover layer, accompanied by flat-ironing-type effects. The top material that can include, if necessary, a textured outer surface can undergo strong smoothing by temporary, partial melting action. Surface changes in the cover layer cannot be avoided in the presence of high temperatures during production. The prior art has therefore been reliant on lead-containing catalysts to date.

After performing numerous experimental series and testing involving the most varied materials, it was found according to the invention, for the first time, that it is possible to forego the use of lead-containing catalysts, and that the use of lead-free catalysts is possible.

In the context of the invention, the polyol component no longer contains any lead-containing component or, if at all, a negligible quantity.

For the adjustment of the hardness, especially the Shore hardness, of the bead, the determinative aspect is the chain length of the polyols and/or the ability of the polyols to crystallize, namely of the mentioned polyetherols or polyesterols or of a mixture thereof.

Water is a further component of the polyol component that is optionally included Finally, numerous further excipients and/or additives can be contained in the polyol component, such as, for example, antioxidants, antistatics, biocides, separating agents and/or fillers, such as glass (in flour, bead or fiber form), as well as colorants, for example pigments or soot.

The polyol component can contain further emulsifiers, foam stabilizers, UV stabilizers and/or antioxidants that are taken from the list of materials below, or mixtures of a plurality of the materials listed below:

$C_{14}H_{28}O_2Si$;
$C_8H_{12}O_3$;
neodecanoic acid;
methyl 2-ethyldecanoate;
benzenebutanoic acid, 2,5-dimethyl-γ-oxo-;
4-[2-(4-hydroxy-phenyl)-vinyl]-benzoic acid;
dimethyl{bis[(2z)-pent-2-en-1-yloxy]}silane;
1,3-propanediol,2-ethyl-2-(hydroxymethyl)-;
butane, 2,2,3-trimethyl-;
2-methylbutane-1,4-diol, 3-(1-ethoxyethoxy)-;
2-(2-hexyloxyethoxy)ethanol;
n-hexadecanoic acid;
octaethylene glycol monododecyl ether;
n-heptadecanol-1;

trans-13-octadecenoic acid;
octadecanoic acid;
4-(3,5-di-tert-butyl-4-hydroxyphenyl)butyl acrylate;
17-androstanone, 3-(3,4-dimethylphenyl)-3-methyl-;
4h-cyclopentacycloocten-4-one, decahydro-;
phthalic acid, di(3-methylphenyl) ester;
phthalic acid, 4-isopropylphenyl 3-methylphenyl ester;
4-(3,5-di-tert-butyl-4-hydroxyphenyl)butyl acrylate.

According to the invention, a lead-free catalyst is envisioned as a constituent of the polyol component. This can be a material that comprises amines or that is provided by them; or, alternately, a catalyst that includes a tin compound and/or a bismuth compound and/or a thallium compound and/or a zinc compound and/or a rare earth compound or a mixture thereof, or that is made thereof.

According to an advantageous embodiment of the invention, the polyol component includes colorants or pigments that result in the color of the bead approximating the color of the outer face of the top or matching the top of the motor vehicle. For example, during the manufacture of a motor-vehicle top with a beige-colored outer face, it is possible to incorporate beige-colored pigments in the sealing mass, namely the polyol component, that provide a corresponding beige coloring of the cured bead.

Furthermore, the invention relates to a method of making a motor-vehicle top. The method comprises the following steps:

A) providing a flexible, particularly textile, cover layer with a cutout therein in a mold;
B) providing at least one window, particularly a rear window, in the cutout;
C) incorporating a polyurethane sealing compound made of two components, namely an isocyanate component and a polyol component, into the mold in an intermediate space between a circumferential edge region of the cover layer and an outer window edge, the polyol component comprising at least the following constituents:
  a) polyols, herein polyetheroles and/or polyesteroles;
  b) a propellant;
  c) a lead-free catalyst;
D) reacting the two components at a temperature below 110° C., particularly below 100° C., particularly below 95° C., particularly below 90° C., particularly below 80° C., particularly below 70° C., particularly below 60° C., particularly below 50° C.;
E) removing the top formed in this manner from the mold.

According to the method, a cover layer is provided first in the mold. For example, this can be a mold as shown schematically in applicant's republished German patent application DE 10 2011 120 953.4 [US 2013/0038083].

This is a conventional mold that has the cover layer positioned therein in such a manner that the cutout that is included in the cover layer comes to be provided in a predetermined position. The cover layer is flexibly embodied and is made, in particular, of a textile material.

According to a further step, a rear window is provided inside the cutout. This rear window can be inserted first into the mold, followed by the cover layer such that the rear window is provided relative to the textile cover layer inside the top cutout. The order of steps A) and B) is immaterial with regard to the method according to claim 9 according to the invention.

Afterward, a polyurethane sealing compound is added to the mold.

The polyurethane sealing compound is constituted of two components. They are incorporated using a so-called one-shot-method. This means that the isocyanate component (pre-polymer isocyanate) with a corresponding quantity of the polyol component is blended in a single shot, and reacted.

The sealing compound is incorporated in the intermediate space between the edge of the cover layer that frames the cutout and an outer edge of the window. The sealing compound is made of two components. The first component is an isocyanate component, and the second component is a polyol component. The isocyanate component can be a di-isocyanate component and/or a polyisocyanate component. Similarly, the polyol component can be made of diols, tirols or polyols.

The polyol component in turn includes at least the following constituents:
  a) polyols, herein polyetherols and/or polyesterols;
  b) a propellant;
  c) a lead-free catalyst.

To avoid repetition and for reference purposes relative to individual or multiple characteristics in terms of the constituents of the polyol component and, if necessary, further constituents of the polyol component, we refer to the embodiments in the device claims.

According to step D), it is further provided that the two components react at a temperature below 110° C. The two components react advantageously at a temperature below 100° C., particularly below 95° C., particularly below 90° C., particularly below 80° C., particularly below 70° C., particularly below 60° C., particularly below 50° C.

Finally, the sealing compound cures within a few moments, such that the top can be removed from the mold. Owing to the polyurethane bead, the convertible top and the rear window form a durable, mechanically secure and leak-proof connection with each other.

According an advantageous embodied example of the invention, during the implementation of the method, the mold is maintained at a temperature below 110° C., particularly at a temperature below 100° C., more particularly at a temperature below 95° C., and more advantageously at a temperature below 90° C., and more advantageously at a temperature below 85° C.

Due to the fact that the temperature of the mold is maintained below the mentioned temperature limits, it is possible to avoid damaging or compromising the cover layer.

According to an advantageous embodiment of the invention, it is provided, moreover, that the temperature of the mold and the reaction temperature of the two components (isocyanate and polyol components) have a minimal temperature difference. Preferably, the temperature difference between the reaction temperature and the tool temperature is less than 20° C., particularly less than 15° C., further advantageously less than 10° C.

If the temperature differences or gradients between the reaction temperature and the tool temperature are too great, disadvantageous surface properties may result in the area of the formed polyurethane bead.

An example for a composition of the polyol component shall be provided below. The embodiment contains the following constituents in quantities according to the indicated weight-percent information:
  m) ethanediol (glycol) 10%<m %<25%,
  n) 2,2'-iminodiethanol; diethanolamine 3%<n %<5%,
  o) bismuth(3+)neodecanoate 1%<o %<5%,
  p) phenol, 2-(2h-benzotriazol-2-yl)-6-dodecyl-4-methyl-, branched and linear 0.1%<p %<2.5%,
  q) derivative of piperidine 0.25%<q %<1%,
  r) alkyl ammonium salt 0.1%<r %<0.25%,
  s) balance: water, polyetherols and/or polyesterols and excipients.

This material was reacted at temperatures between 80° C. and 90° C., preferably about 85° C.

The numerous tests that were performed on the completed top demonstrated the desired results in terms of solidity and durability of the connecting area between the window and the cover layer with regard to mechanical and thermal stresses.

To clarify, it should be noted that the information in the above embodiment involving m %, n %, o %, p %, q % and r % respectively indicate respectively the quantities of the constituents m, n, o, p, q, r, s of the polyol component in weight percent relative to the total weight of the polyol component.

In a first embodiment, the values were always in the arithmetic mean between the indicated range limits. Correspondingly, constituent m was at (10+25): 2=17.5%, constituent n at (3+5): 2=4%, constituent o at (1+5): 2=3%, constituent p at (0.1+2.5): 2=1.3%, constituent q at (0.25+1): 2=0.625%, the fraction of excipients and additives (pigments, glass) is overall at 10%, and the balance of the is constituents comprises the materials water, polyetherols and/or polyesterols and excipients at 63.575%.

In a further embodiment, the constituents m to r were varied in terms of the quantities thereof, staying, however, within the indicated range limits. The balance water was added in such a manner that there resulted a total quantity of 100%.

The constituents o), p), and q) of the embodiment correspond to the constituent d) (lead-free catalyst) of the polyol component according to claim 1.

The constituent s) of the embodiment (water) comprises the component b) (propellant) of the polyol component according to claim 1.

The polyol component that is used in the embodiment is commercially available under the trade name COLO-FAST* R 8959/106/L300, production by the company BASF Polyurethanes GmbH in Lemfoerde.

In a further embodiment of the invention, the fraction of polyetherols and/or polyesterols in the polylol component is between 60 and 80, advantageously between 70 and 78, further advantageously about 77% (weight percent).

BRIEF DESCRIPTION OF THE DRAWING

In the drawing:
FIG. 1 is a perspective view of a motor-vehicle top according to the invention; and
FIG. 2 is a section taken along line II-II of FIG. 1.

DETAILED DESCRIPTION OF THE INVENTION

FIG. 1 shows, in a very schematic view, an embodiment of a motor-vehicle top according to the invention, the top being shown in a single representation in a schematic rear view. The motor vehicle is not shown.

The top as a whole is designated at 10 and includes a cover layer 11 and a rear window 12 inserted in a cutout.

The window 12 can be made of mineral glass or polycarbonate or, alternately, of a sandwich of mineral glass and polycarbonate.

The rear window is circumferentially connected at its outer edge by a bead 13 to the inner edge 11a of the cutout of the cover layer 11.

As seen in FIG. 2, the bead that is shown schematically has a substantially square cross-section. However, according to the invention, the bead can have any conceivable cross-section.

The cover layer 11, which is made of a special textile material, is highly temperature-sensitive. The temperature may not exceed the critical value of about 90° C. A distinction must be drawn between the temperature of the tool and the temperature increase that may possibly occur, in addition, due to heat release during the reaction of the two components. In particular, the area of the outer face of the cover layer, which is directly adjacent the edge of the window in the assembled state, may not be subjected to excess temperatures during the manufacturing process.

The invention claimed is:

1. A method of making a flexibly configured motor-vehicle convertible top comprising a flexible cover layer forming an outer face of the convertible top and having a cutout that holds at least one window, a circumferential inner edge of the flexible cover layer around the cutout being connected to an outer window edge by a polyurethane bead that is synthesized in a polyaddition reaction by reacting an isocyanate component with a polyol component, comprising the steps of:
    a) providing a flexible cover layer with a cutout therein in a mold;
    b) providing at least one window in the cutout;
    c) incorporating a polyurethane sealing compound made of two components, namely an isocyanate component and a polyol component in the form of a polyether polyol or a polyester polyol, into the mold in an intermediate space between a circumferential edge region of the flexible cover layer and an outer window edge, wherein the polyol component comprises at least the following constituents:
        a) polyetherols or polyesterols;
        b) a propellant;
        c) a lead-free catalyst;
    d) reacting the two components in a polyaddition reaction at a temperature below 110° C. to form a polyurethane bead which provides a durable, mechanically secure and leak-proof connection between the circumferential edge region of the flexible cover layer and the at least one window; and
    e) removing the convertible top that was formed from the mold.

2. The method according to claim 1, further comprising during steps a)-e):
    maintaining the mold at a temperature below 110° C.

3. The method according to claim 1, wherein a fraction of the lead-free catalyst is 0.05-2 wt. %, relative to the total weight of the polyol component.

4. The method according to claim 1, wherein according to step d) the two components are reacted at a temperature below 85° C.

5. The method according to claim 2, wherein the mold is maintained at a temperature below 85° C.

6. The method according to claim 1, wherein the flexible cover layer is a textile.

7. The method according to claim 1 wherein the lead-free catalyst used to prepare the polyurethane bead includes a lead-free metal compound or an amine.

8. The method according to claim 7 wherein the lead-free metal compound is a tin compound, a bismuth compound, a thallium compound, a zinc compound or a rare earth compound.

9. The method according to claim 7 wherein the lead-free metal compound is an organic metal compound.

10. The method according to claim 9 wherein the organic metal compound is a tin salt of a carboxylic acid or a bismuth carboxylate.

11. The method according to claim 10 wherein the bismuth carboxylate is bismuth acetate, bismuth oleate, bismuth octoate, or bismuth neodecanoate.

12. The method according to claim 7 wherein the lead-free catalyst used to prepare the polyurethane bead is an amine selected from the group consisting of a tertiary amine, a piperidine, an alkanolamine and mixtures of these materials.

13. The method according to claim 12 wherein the lead-free catalyst used to prepare the polyurethane bead is a tertiary amine selected from the group consisting of sebacinic acid bis(1,2,2,6,6-pentamethyl-4-5 piperidinyl)ester, 2,3-dimethyl-3,4,5,6-tetrahydropyrimidine, 4-(4-oxo-1,2,3,4,6,7,12,12b-octahydropyrido[2,1-a]-p-carbolin-12b-yl)butyric acid, 1,8-diazabicyclo[5.4.0]undec-7-ene, triethylamine, tributylamine, dimethylbenzylamine, N-methyl-, N-ethyl- or N-cyclohexyl-morpholine, N,N,N'N'-tetramethyl ethyldiamine, N,N,N'N'-tetramethyl butanediamine, N,N,N'N'-tetramethyl hexanediamine, pentamethyl diethylenetriamine, tetramethyl diaminoethylether, bis-(dimethylaminopropyl) urea, dimethylpiperazine, 1,2-dimethylimidazole, 1-azobicyclo(3.3.0)-octane, 1,4-diaza-bicyclo-(2.2.2)-octane, DBU (1,5-diaza-bicyclo[5.4.0]undec-5-ene), malonic acid-2-formalamino-2-[3,5-di-t-butyl-4-hydroxybenzyl]-diethyl(ester), [4,4-Dimethyl-5-(2,3,3-trimethyl-5-methylthio-5-pyrrolin-2-ylmethylene)-5-pyrrolin-2-ylthio]-acetic acid-tert.-butyl-ester, 10-oxo-5,5-dimethyl-5-sila-5,10-dihydro-5H-benzo[e]pyrido[3,4-b]azepine, and decahydroisoquinoline-3-carboxyl acid methylester.

14. The method according to claim 12 wherein the lead-free catalyst used to prepare the polyurethane bead is a piperidine selected from the group consisting of 1-(1-cyclopropyl-pentyl)piperidine and bis(1,2,2,6,6-pentamethyl-4-piperidyl)sebacate.

15. The method according to claim 12 wherein the lead-free catalyst used to prepare the polyurethane bead is an alkanolamine selected from the group consisting of triethanolamine, triisopropanolamine, N-methyl- and N-ethyldiethanolamine, and N,N-dimethylethanolamine.

16. The method according to claim 1 wherein the addition reaction occurs at a temperature below 85° C.

17. The flexibly configured motor vehicle convertible top prepared according to the method defined in claim 1.

18. A flexibly configured motor-vehicle convertible top comprising a flexible cover layer forming an outer face of the convertible top and having a cutout that holds at least one window, a circumferential inner edge of the flexible cover layer around the cutout being connected to an outer window edge by a polyurethane bead that is synthesized in a polyaddition reaction by reacting an isocyanate component with a polyol component, the polyol component comprising at least the following constituents:
   a) a polyol in the form of a polyether polyol or a polyester polyol;
   b) a propellant;
   c) a lead-free catalyst, wherein the polyurethane bead provides a durable, mechanically secure and leak-proof connection between the circumferential edge region of the flexible cover layer and the at least one window; and
   d) pigments that produce the effect that the color of the synthesized polyurethane bead is approximately the corresponding color of the outer face of the convertible top, or matches it.

19. The flexibly configured motor-vehicle convertible top defined in claim 18 wherein the at least one window is a rear window.

20. The flexibly configured motor-vehicle convertible top according to claim 18, wherein the color of the corresponding outer face of the convertible top and the color of the polyurethane bead are of a color that is not black.

21. The flexibly configured motor-vehicle convertible top according to claim 18, wherein the flexible cover layer is a textile.

22. A flexibly configured motor-vehicle convertible top comprising a flexible cover layer forming an outer face of the convertible top and having a cutout that holds at least one window, a circumferential inner edge of the flexible cover layer around the cutout being connected to an outer window edge by a polyurethane bead that is synthesized in a polyaddition reaction by reacting an isocyanate component with a polyol component, the polyol component comprising at least the following constituents:
   a) a polyol in the form of a polyether polyol or a polyester polyol;
   b) a propellant; and
   c) a lead-free catalyst, wherein the polyurethane bead provides a durable, mechanically secure and leak-proof connection between the circumferential edge region of the flexible cover layer and the at least one window.

* * * * *